US010392541B2

(12) United States Patent
Takenaka et al.

(10) Patent No.: US 10,392,541 B2
(45) Date of Patent: Aug. 27, 2019

(54) HOT MELT ADHESIVE

(71) Applicant: Henkel AG & Co. KGaA, Duesseldorf (DE)

(72) Inventors: Makoto Takenaka, Osaka (JP); Tadashi Hayakawa, Osaka (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 107 days.

(21) Appl. No.: 15/136,062

(22) Filed: Apr. 22, 2016

(65) Prior Publication Data

US 2016/0237329 A1 Aug. 18, 2016

Related U.S. Application Data

(63) Continuation of application No. PCT/JP2014/079003, filed on Oct. 24, 2014.

(30) Foreign Application Priority Data

Oct. 24, 2013 (JP) ................................ 2013-221628

(51) Int. Cl.

| | |
|---|---|
| ***B32B 27/06*** | (2006.01) |
| ***B32B 27/32*** | (2006.01) |
| ***B32B 27/36*** | (2006.01) |
| ***B32B 7/12*** | (2006.01) |
| ***C09J 123/22*** | (2006.01) |
| ***C09J 167/04*** | (2006.01) |
| ***C09J 109/00*** | (2006.01) |
| ***C09J 153/00*** | (2006.01) |
| ***C09J 153/02*** | (2006.01) |
| ***C09J 123/08*** | (2006.01) |
| ***C08L 23/08*** | (2006.01) |
| ***C08L 67/04*** | (2006.01) |
| ***C09J 7/24*** | (2018.01) |
| ***C09J 7/25*** | (2018.01) |
| ***C08L 23/12*** | (2006.01) |
| ***C08L 91/00*** | (2006.01) |

(52) U.S. Cl.

CPC ............... *C09J 167/04* (2013.01); *B32B 7/12* (2013.01); *B32B 27/06* (2013.01); *B32B 27/32* (2013.01); *B32B 27/36* (2013.01); *C08L 23/08* (2013.01); *C08L 23/12* (2013.01); *C08L 67/04* (2013.01); *C08L 91/00* (2013.01); *C09J 7/241* (2018.01); *C09J 7/255* (2018.01); *C09J 109/00* (2013.01); *C09J 123/08* (2013.01); *C09J 123/22* (2013.01); *C09J 153/005* (2013.01); *C09J 153/025* (2013.01); *B32B 2250/02* (2013.01); *B32B 2255/10* (2013.01); *B32B 2255/26* (2013.01); *B32B 2605/003* (2013.01); *C08L 2205/04* (2013.01); *C09J 2423/00* (2013.01); *C09J 2467/00* (2013.01)

(58) Field of Classification Search

CPC ......... B32B 27/06; B32B 27/32; B32B 27/36; B32B 7/12; B32B 2250/02; B32B 2255/10; B32B 2255/26; B32B 2605/003; C08L 23/08; C09J 153/025; C09J 167/04; C09J 7/0271; C09J 7/0285; C09J 2423/00; C09J 2467/00

See application file for complete search history.

(56) References Cited

U.S. PATENT DOCUMENTS

| | | | | |
|---|---|---|---|---|
| 4,120,916 | A * | 10/1978 | Meyer, Jr. | C09J 123/02 428/182 |
| 9,481,815 | B2 * | 11/2016 | Takenaka | C09J 167/02 |
| 9,481,816 | B2 * | 11/2016 | Takenaka | C09J 123/26 |
| 2007/0042193 | A1 | 2/2007 | Wang | |
| 2008/0312401 | A1 | 12/2008 | Sato et al. | |
| 2011/0229721 | A1 | 9/2011 | Hoch et al. | |
| 2013/0225020 | A1 | 8/2013 | Flood et al. | |

FOREIGN PATENT DOCUMENTS

| | | | |
|---|---|---|---|
| JP | H05339557 | A | 12/1993 |
| JP | H07150123 | A | 6/1995 |
| JP | 3330390 | B2 | 9/2002 |
| JP | 2004256642 | A | 9/2004 |
| JP | 2009126991 | A | 6/2009 |
| JP | 2010155951 | A | 7/2010 |
| WO | 02053669 | A2 | 7/2002 |
| WO | 2007022372 | A2 | 2/2007 |
| WO | WO2013162058 | A1 * | 10/2013 |
| WO | WO2013162059 | A1 * | 10/2013 |

OTHER PUBLICATIONS

International Search Report for International PCT Patent Application No. PCT/JP2014/079003 dated Feb. 19, 2015.

* cited by examiner

*Primary Examiner* — Irina S Zemel
*Assistant Examiner* — Jeffrey S Lenihan
(74) *Attorney, Agent, or Firm* — James E. Piotrowski

(57) ABSTRACT

The present invention provides a hot melt adhesive which is excellent in environmental friendliness, thermal stability, adhesion to a polyolefin substrate and a polyester substrate, and heat resistance. The present invention relates to a hot melt adhesive comprising (A) a polar functional group-modified conjugated diene-based polymer, (B) an aliphatic polyester-based resin, (C) an amorphous olefin-based polymer, (D) a crystalline polypropylene resin, and (E) a tackifier resin.

19 Claims, No Drawings

HOT MELT ADHESIVE

TECHNICAL FIELD

The present application is filed, claiming the Paris Convention priority based on Japanese Patent Application No. 2013-221628 (filed on Oct. 24, 2013), and the entire content of which is incorporated herein by reference.

The present invention relates to a hot melt adhesive, and more particularly to a hot melt adhesive which exhibits good adhesion to substrates such as polyolefin and polyester substrates, and is particularly suitable for an application for automotive interior materials.

BACKGROUND ART

A hot melt adhesive is a solvent-free adhesive and has features enabling of instant bonding and high-speed bonding since the adhesive exhibits adhesion after the adhesive is melted by heating, applied to an adherent and then solidified by cooling. For example, the hot melt adhesive is now widely used in paper processing, woodworking, sanitary materials, electronic fields, and automotive interior materials.

Patent Document 1 discloses a hot melt adhesive for automotive interior materials, containing an α-olefin-based polymer as a main component (see, for example, component (A) of [Claim 1]). A door trim and a roof trim, which are automotive interior materials, are frequently obtained by forming a polyolefin such as a propylene resin. Therefore, the hot melt adhesive disclosed in the same document contains a large amount of the α-olefin-based polymer, thus improving adhesion to the automotive interior material.

Furthermore, a crystalline polypropylene having a melting point of 120° C. or higher is blended in the hot melt adhesive disclosed in the same document (see component (B) of [Claim 1]). The crystalline polypropylene resin enables the hot melt adhesive to become more suitable for applications such as automotive interior materials, as a result of an improvement in heat resistance ([0024]).

However, polyester is sometimes used in the automotive interior material such as a skin of the ceiling section. The hot melt adhesive of Patent Document 1 is excellent in adhesion to a polyolefin substrate, but exhibits insufficient adhesion to the polyester substrate. The hot melt adhesive of Patent Document 1 is also excellent in heat resistance; on the other hand, it is likely to undergo embitterment, leading to insufficient peel strength.

In the automotive field, due to growing concern about environmental problems, the replacement of conventional raw materials derived from petroleum by natural materials, vegetable materials, and biodegradable materials has made progress. From the viewpoint of environmental problems such as global warming due to an increase in emission of a carbon dioxide gas, a study has also been made on a polylactic acid-based resin using no petroleum as a raw material, relating to automotive interior materials and adhesives.

Patent Document 2 discloses a hot melt adhesive containing a polylactic acid-based resin and polybutylene succinate or polyethylene succinate. Patent Document 3 discloses a hot melt adhesive containing polylactic acid and a polyvinyl alcohol-based resin. Patent Document 4 makes mention of a hot melt adhesive composition which is a composition containing, as main components, a thermoplastic resin and a tackifier, one or both of which contain(s) a polylactic acid, or a lactic acid copolymer resin derived from lactic acid and other hydroxycarboxylic acids.

A polylactic acid-based hot melt adhesive tends to be inferior in tackiness, adhesion, thermal stability, heat resistance, and the like as compared with a polyolefin-based hot melt adhesive. The polylactic acid-based hot melt adhesives disclosed in Patent Documents 2 to 4 were not suited for application for automotive interior materials because of particularly poor adhesion to a polyolefin substrate used in automotive interior materials, and the like.

A method for blending a polyolefin in the polylactic acid-based hot melt adhesive is proposed as means for enhancing adhesion to the polyolefin substrate. However, polylactic acid had a problem that it is hard to be mixed with the polyolefin, is also inferior in compatibility with the "tackifier resin" which is an additive of the hot melt adhesive, and has poor thermal stability.

CITATION LIST

Patent Literature

Patent Document 1: JP 2009-126991 A
Patent Document 2: JP 2010-155951 A
Patent Document 3: JP 2004-256642 A
Patent Document 4: JP 5-339557 A

SUMMARY OF INVENTION

Technical Problem

An object of the present invention is to solve the problems mentioned above, and to provide a hot melt adhesive which has high environmental friendliness and high thermal stability, is excellent in adhesion to a polyolefin substrate and a polyester substrate, and is also excellent in heat resistance.

Solution to Problem

Preferred embodiments of the present invention are as follows.

1. A hot melt adhesive comprising:
(A) a polar functional group-modified conjugated diene-based polymer,
(B) an aliphatic polyester-based resin,
(C) an amorphous olefin-based polymer,
(D) a crystalline polypropylene resin, and
(E) a tackifier resin.

2. The hot melt adhesive according to the above 1, wherein the polar functional group is at least one functional group selected from an acid anhydride group, a maleic acid group, a carboxyl group, an amino group, an amino group, an alkoxysilyl group, a silanol group, a silylether group, a hydroxyl group, and an epoxy group.

3. The hot melt adhesive according to the above 1 or 2, wherein the polar functional group-modified conjugated diene-based polymer (A) comprises at least one selected from an amino group-modified hydrogenated-type styrene block copolymer and a maleic acid group-modified hydrogenated-type styrene block copolymer.

4. The hot melt adhesive according to any one of the above 1 to 3, wherein the aliphatic polyester-based resin (B) comprises a polylactic acid-based resin.

5. The hot melt adhesive according to any one of the above 1 to 4, wherein the amorphous olefin-based polymer (C) comprises an ethylene/propylene/1-butene copolymer.

6. The hot melt adhesive according to any one of the above 1 to 5, wherein the amount of the crystalline polypropylene resin (D) is 3 to 30 parts by weight based on 100 parts by weight of the total weight of the components (A) to (E).

7. An automotive interior material obtained by applying the hot melt adhesive according to any one of the above 1 to 6.

Advantageous Effects of Invention

According to the present invention, blending a polar functional group-modified polymer in a hot melt adhesive enables an improvement in compatibility of an aliphatic polyester-based resin such as a polylactic acid-based resin with other components, thus making it possible to provide a hot melt adhesive which is environmentally friendly and also exhibits improved adhesion to a polyolefin substrate and a polyester substrate, and thermal stability, and which is also excellent in heat resistance and is particularly suited for an application for automotive interior materials.

DESCRIPTION OF EMBODIMENTS

The hot melt adhesive of the present invention comprises at least (A) a polar functional group-modified conjugated diene-based polymer, (B) an aliphatic polyester-based resin, (C) an amorphous olefin-based polymer, (D) a crystalline polypropylene resin, and (E) a tackifier resin, which may be also referred to as "component A", "component B", "component C", "component D", and "component E", respectively.

As used herein, "modified polymer" means both of (i) those in which a functional group is imparted after obtaining a polymer and (ii) those in which a functional group is introduced in the process of polymerization.

<(A) Polar Functional Group-Modified Conjugated Diene-Based Polymer>

The hot melt adhesive of the present invention contains a polar functional group-modified conjugated diene-based polymer (A) (component A), and thus, compatibility of an aliphatic polyester-based resin (B) with other components such as an amorphous olefin-based polymer (C), a crystalline polypropylene resin(D), and a tackifier resin (E) is enhanced, thus improving tackiness, adhesion, and thermal stability.

The polar functional group-modified conjugated diene-based polymer (A) used in the present invention means a conjugated diene-based polymer having at least one polar functional group. There is no particular limitation on the position into which a polar functional group is introduced, and the position may be either the ends of the polymer, or the inside except for the ends of the polymer. The polar functional group may be either imparted to the obtained polymer, or introduced in the process of polymerizing monomers.

Examples of the "polar functional group" include an acid anhydride group such as a maleic anhydride group; a carboxyl group, a maleic acid group, an amino group, an amino group, an alkoxysilyl group, a silanol group, a silylether group, a hydroxyl group, and an epoxy group. Of these groups, a maleic anhydride group, a maleic acid group, an amino group, an epoxy group, and a carboxyl group are preferable.

The "conjugated diene-based polymer" means a polymer comprising a structural unit (conjugated diene unit) based on a conjugated diene compound.

Here, the "conjugated diene compound" means a diolefin compound having at least one pair of conjugated double bonds. Specific examples of the "conjugated diene compound" include, for example, 1,3-butadiene, 2-methyl-1,3-butadiene (or isoprene), 2,3-dimethyl-1,3-butadiene, 1,3-pentadiene, and 1,3-hexadiene. 1,3-Butadiene and 2-methyl-1,3-butadiene are particularly preferable. These conjugated diene compounds can be used alone or in combination.

In the present invention, the conjugated diene-based polymer may comprise, in addition to a conjugated diene unit, structural units based on other monomers. Examples of other monomers include a vinyl-based aromatic hydrocarbon, vinylnitrile and an unsaturated carboxylic acid ester.

In the present invention, there is no particular limitation on the "conjugated diene-based polymer" as long as the objective hot melt adhesive of the present invention is obtainable. For example, the conjugated diene-based polymer is preferably a copolymer obtained by block copolymerization of a vinyl-based aromatic hydrocarbon with a conjugated diene compound, i.e. those comprising a vinyl-based aromatic hydrocarbon block and a conjugated diene compound block.

The "vinyl-based aromatic hydrocarbon" means an aromatic hydrocarbon compound having a vinyl group, and specific examples thereof include styrene, o-methylstyrene, p-methylstyrene, p-tert-butylstyrene, 1,3-dimethylstyrene, α-methylstyrene, vinylnaphthalene, and vinylanthracene. Particularly, styrene is preferable. These vinyl-based aromatic hydrocarbons can be used alone or in combination.

In the present invention, the conjugated diene-based polymer composing the polar functional group-modified conjugated diene-based polymer contained as component A may be either an unhydrogenated-type conjugated diene-based polymer or a hydrogenated-type conjugated diene-based polymer, and the hydrogenated-type conjugated diene-based polymer is more preferable.

Examples of the "unhydrogenated-type conjugated diene-based polymer" include a styrene-isoprene-styrene block copolymer (also referred to as "SIS") and a styrene-butadiene-styrene block copolymer (also referred to as "SBS"). Examples of the "hydrogenated-type conjugated diene-based polymer" include a hydrogenated styrene-isoprene-styrene block copolymer (also referred to as a styrene-ethylene/propylene-styrene block copolymer "SEPS") and a hydrogenated styrene-butadiene-styrene block copolymer (also referred to as a styrene-ethylene/butylene-styrene block copolymer "SEBS"). Of these, the conjugated diene-based polymer composing the polar functional group-modified conjugated diene-based polymer contained as component A is preferably SEBS, and more preferably SEBS having a styrene content of 3 to 40% by weight.

Examples of the "polar functional group" of the "polar functional group-modified conjugated diene-based polymer" include an acid anhydride group such as a maleic anhydride group; a carboxyl group, a maleic acid group, an amino group, an amino group, an alkoxysilyl group, a silanol group, a silylether group, a hydroxyl group, and an epoxy group. Of these groups, a maleic acid group and an amino group are more preferable.

Regarding the method for producing the polar functional group-modified conjugated diene-based polymer, it may be produced by synthesizing a conjugated diene-based polymer first, and then introducing a polar functional group, or produced by performing the copolymerization reaction using monomers having a polar functional group.

Examples of the "polar functional group-modified conjugated diene-based polymer" include, for example, an amino group-modified SEBS, a maleic acid group-modified SEBS, and the like.

In the polar functional group-modified conjugated diene-based copolymer, there is no particular limitation on the position into which a polar group such as an amino group or a maleic acid group is introduced. For example, a polar group is preferably introduced at least at one end of the conjugated diene-based copolymer.

It is possible to use, as the polar functional group-modified conjugated diene-based copolymer, commercially available products, and examples thereof include TAFTEC MP10 manufactured by Asahi Kasei Chemicals Corporation; DYNARON 8630P manufactured by JSR Corporation; and TAFTEC M1913 and TAFTEC M1943 manufactured by Asahi Kasei Chemicals Corporation.

In the present invention, component A preferably comprises a polar functional group-modified polymer having a weight average molecular weight (Mw) of $1.0\times10^4$ to $3.0\times10^5$, and particularly preferably a polar functional group-modified conjugated diene-based polymer having a weight average molecular weight of $2.0\times10^4$ to $2.0\times10^5$.

As used herein, the weight average molecular weight is determined with the use of gel permeation chromatography (GPC) by conversion of the molecular weight using a calibration curve which is obtained by using polystyrene having a monodispersed molecular weight as a standard reference material.

In the hot melt adhesive of the present invention, component A is preferably blended in the amount of 1 to 20 parts by weight, and more preferably 2 to 10 parts by weight, based on 100 parts by weight of the total weight of components A to E.

<(B) Aliphatic Polyester-Based Resin>

The hot melt adhesive of the present invention comprises an aliphatic polyester-based resin (B) (component B), and thus, it is possible to reduce the content of a material which uses petroleum as a raw material, and to increase adhesion to a polyester substrate. Since the aliphatic polyester-based resin (B) is comprised together with component A, it is possible to obtain hot melt adhesive which is less likely to undergo embrittlement, and also has high peel strength.

It is possible to use, as the aliphatic polyester-based resin (B), known resins and examples thereof include polylactic acid-based resin, polybutylene succinate, polybutylene succinate adipate, polybutylene succinate terephthalate, polyethylene succinate, polybutylene succinate carbonate, polyglycolic acid, polycaprolactone, polyhydroxybutyric acid, polyhydroxyvaleric acid, hydroxybutyric acid-hydroxyvaleric acid copolymer, and the like. Of these, polylactic acid-based resin, polybutylene succinate, and polyhydroxybutyric acid are preferable, and polylactic acid resin and polybutylene succinate are more preferable. These aliphatic polyester-based resins may be used alone, or two or more thereof may be used in combination.

The polylactic acid-based resin is a polymer comprising L-lactic acid and/or D-lactic acid as main constituents, or may comprise other copolymerization components except for lactic acid. Examples of such other copolymerization component units include polyhydric carboxylic acid, polyhydric alcohol, hydroxycarboxylic acid, lactone, and the like, and specific examples of other copolymerization component units include units produced from polyhydric carboxylic acids such as oxalic acid, malonic acid, succinic acid, glutaric acid, adipic acid, azelaic acid, sebacic acid, dodecanedioic acid, fumaric acid, cyclohexanedicarboxylic acid, terephthalic acid, isophthalic acid, phthalic acid, 2,6-naphthalenedicarboxylic acid, anthracenedicarboxylic acid, 5-sodiumsulfoisophthalic acid, and 5-tetrabutylphosphonium sulfoisophthalic acid; polyhydric alcohols such as ethylene glycol, propylene glycol, butanediol, heptanediol, hexanediol, octanediol, nonanediol, decanediol, 1,4-cyclohexanedimethanol, neopentyl glycol, glycerin, pentaerythritol, bisphenol A, aromatic polyhydric alcohol obtained by the addition reaction of bisphenol with ethylene oxide, diethylene glycol, triethylene glycol, polyethylene glycol, polypropylene glycol, and polytetramethylene glycol; hydroxycarboxylic acids such as glycolic acid, 3-hydroxybutyric acid, 4-hydroxybutyric acid, 4-hydroxyvaleric acid, 6-hydroxycaproic acid, and hydroxybenzoic acid; and lactones such as glycolide, ε-caprolactone glycolide, ε-caprolactone, β-propiolactone, δ-butyrolactone, β- or γ-butyrolactone, pivalolactone, and δ-valerolactone. The content of such other copolymerization component units except for lactic acid unit is commonly adjusted within a range of 0 to 30 mol %, and preferably 0 to 10 mol %, based on 100 mol % of the whole monomer units.

In the hot melt adhesive of the present invention, component B is preferably comprised in the amount within a range of 5 to 50 parts by weight, and more preferably 10 to 35 parts by weight, based on 100 parts by weight of the total weight of components A to E.

<(C) Amorphous Olefin-Based Polymer>

The hot melt adhesive of the present invention contains an amorphous olefin-based polymer (C), and thus, adhesion to a polyolefin substrate increases. An improvement in adhesion to a polyolefin substrate enables the hot melt adhesive of the present invention to become suitable for the production of automotive interior materials and disposable products such as sanitary materials made of a polyolefin, especially automotive interior materials.

In the present invention, the amorphous olefin-based polymer (C) means an olefin-based polymer having no clear melting point and preferably melts at 180° C. or lower. Here, "amorphous" commonly means no-crystalline, and more specifically means a state where polymeric molecular chains are irregularly arranged.

The amorphous olefin-based polymer (C) is commonly called as an amorphous poly α-olefin and is not particularly limited as long as the hot melt adhesive according to the present invention is obtainable.

As used herein, the "olefin-based polymer" means a polymer comprising a structural unit based on an olefin, and may be either an olefin homopolymer, or a copolymer obtained by copolymerizing with a compound copolymerizable with an olefin. In the present invention, the polyolefin-based copolymer comprises 50% by weight or more, and preferably 80% by weight or more (including 100% by weight) of an olefin. The olefin-based polymer may comprise a structural unit based on a compound copolymerizable with an olefin, and preferably an olefin-based copolymer comprises less than 50% by weight, and preferably less than 20% by weight (including 0% by weight) of a compound copolymerizable with an olefin.

The amorphous olefin-based polymer (C) of the present invention may be either a homopolymer or a copolymer, and preferably a copolymer and preferably comprises an ethylene-based copolymer. As used herein, the "ethylene-based copolymer" means a copolymer of ethylene with other polymerizable monomers.

The "other polymerizable monomer" means a monomer having a double bond between carbon atoms which is addition polymerizable with ethylene.

Specific examples of "other polymerizable monomers" include, for example, an "olefin-based hydrocarbon except for ethylene" and a "carboxylic acid ester having an ethylenic double bond".

Examples of the "olefin-based hydrocarbon except for ethylene" include an α-olefin having 3-20 carbon atoms, and specific examples thereof include propylene, 1-butene, 1-pentene, 1-hexene, 1-heptene, 1-octene, 1-nonene, 1-decene, cis-2-butene, trans-2-butene, isobutylene, cis-2-pentene, trans-2-pentene, 3-methyl-1-butene, 2-methyl-2-butene, and 2,3-dimethyl-2-butene.

Examples of the "carboxylic acid ester having an ethylenic double bond" include (meth)acrylic acid esters such as methyl (meth)acrylate, butyl (meth)acrylate, and 2-ethylhexyl (meth)acrylate; and vinyl carboxylate and allyl ester, such as vinyl acetate and allyl acetate.

These "other polymerizable monomers" can be used alone, or two or more thereof can be used in combination.

In the present invention, the ethylene-based copolymer preferably comprises a "copolymer of ethylene with an olefin except for ethylene". Therefore, the "other polymerizable monomer" is preferably an "olefin-based hydrocarbon except for ethylene", particularly preferably an α-olefin having 3-20 carbon atoms, and more preferably propylene, butene, or octene.

The "copolymer of ethylene with olefin except for ethylene" is preferably a copolymer of ethylene with α-olefin having 3-20 carbon atoms, specifically, a copolymer of ethylene with octene, a copolymer of ethylene with propylene and 1-butene, a copolymer of ethylene with propylene, a copolymer of ethylene with butane, or the like, more preferably a copolymer of ethylene with octene or a copolymer of ethylene with propylene and 1-butene, and particularly preferably a copolymer of ethylene with propylene and 1-butene. These copolymers of ethylene with an olefin except for ethylene can be used alone, or two or more thereof can be used in combination.

It is possible to use commercially available products as the copolymer of ethylene with an olefin except for ethylene.

Examples of the "copolymer of ethylene with propylene and 1-butene" include, for example, VESTPLAST 703 (trade name), VESTPLAST 708 (trade name), VESTPLAST 750 (trade name) and the like manufactured by EVONIK DEGUSSA.

Examples of the "copolymer of ethylene with octene" include, for example, AFFINITY GA1900 (trade name), AFFINITY GA1950 (trade name), AFFINITY EG8185 (trade name), AFFINITY EG8200 (trade name), ENGAGE 8137 (trade name), ENGAGE 8180 (trade name), ENGAGE 8400 (trade name) and the like manufactured by The Dow Chemical Company.

Examples of the "copolymer of ethylene with propylene" include, for example, Eastoflex E1016PL-1 and the like manufactured by Eastman Chemical Company.

In the present invention, the ethylene-based copolymer may comprise a copolymer of ethylene with at least one selected from "carboxylic acid esters having an ethylenic double bond", and commercially available products can be used. These copolymers can be used alone, or two or more thereof can be used in combination.

Examples of the "copolymer of ethylene with a carboxylic acid ester having an ethylenic double bond" include, for example, an ethylene-vinyl acetate copolymer, an ethylene-methyl methacrylate copolymer, an ethylene-2-ethylhexyl acrylate copolymer, an ethylene-butyl acrylate copolymer, an ethylene-butyl methacrylate copolymer, and the like. Of these copolymers, an ethylene-vinyl acetate copolymer and an ethylene-methyl methacrylate copolymer are more preferable, and an ethylene-vinyl acetate copolymer is particularly preferable.

The above-mentioned amorphous olefin-based polymers (C) may be used alone, or two or more thereof may be used in combination.

In the hot melt adhesive of the present invention, the amount of the component C is preferably 5 to 60 parts by weight, more preferably 15 to 50 parts by weight, and still more preferably 20 to 40 parts by weight, based on 100 parts by weight of the total weight of components A to E. When the amorphous olefin-based polymer (C) is blended in the amount within the above range, adhesion of the hot melt adhesive to a polyolefin substrate is improved.

<(D) Crystalline Polypropylene Resin>

The hot melt adhesive of the present invention comprises a crystalline polypropylene resin (D), and thus, heat resistance is improved. A hot melt adhesive having excellent heat resistance is remarkably suitable for an application for automotive interior materials which require durability at high temperature in summer.

In the present invention, the crystalline polypropylene resin (D) means a polypropylene resin having a melting point. Here, "crystalline" commonly means non-amorphous, and more specifically means a state where polymeric molecular chains are regularly arranged.

In the present invention, it is possible to use, as the crystalline polypropylene resin (D), homo polypropylene, random polypropylene and modified substances thereof.

The crystalline polypropylene resin (D) preferably has a melting point of 120° C. or higher, and more preferably 130° C. or higher, and preferably 170° C. or lower. More preferably, the melting point is 120° C. or higher and the amount of heat of fusion is 50 J/g or more. Still more preferably, the melting point is 120° C. or higher, the amount of heat of fusion is 50 J/g or more, and the melt flow [JIS K7210] is 200 to 1,500 (g/10 min). Particularly preferably, the melting point is 120° C. or higher, the amount of heat of fusion is 50 J/g or more, and the melt flow [JIS K7210] is 200 to 1,200 (g/10 min).

Here, the "melting point" means the value measured by a differential scanning calorimeter (DSC). A difference in the amount of heat between a measurement sample and a standard reference material is measured by the differential scanning calorimeter, thus the melting point of the measurement sample is calculated. Specifically, a peak top of an endothermic peak observed by raising the temperature from −50° C. to 220° C. at a rate of 10° C./min was regarded as the melting point.

The "amount of heat of fusion" means the amount of heat absorbed from the outside when the substance is melted, and is a kind of latent heat. The amount of heat of fusion can be measured by DSC. Usually, it is represented by the amount of heat required to melt 1 g of the substance.

The "melt flow rate" means an indicator representing fluidity of a resin, and is determined in the following manner; a given amount of a synthetic resin is heated at 230° C. and pressurized in a cylindrical vessel heated by a heater, and then the amount of the resin, extruded through an opening (nozzle) provided on the bottom of the vessel, per 10 minutes is measured. Unit to be used is "g/10 min.".

In the hot melt adhesive of the present invention, when the crystalline polypropylene resin (D) has a melting point and a melt flow within the above range, heat resistance is improved, and also it becomes easy to apply the hot melt adhesive to a polyolefin substrate and a polyester substrate.

In the present invention, the amorphous olefin-based polymer (C) can be also easily distinguished from the crystalline polypropylene resin (D) by the use of DSC. DSC measurement enables observation of the melting point of the crystalline polypropylene resin (D) as an endothermic peak when the temperature rises, while enables observation of the melting point as an exothermic peak when the temperature falls. Since the melting point of the amorphous olefin-based polymer (C) is not clearly observed when measured by DSC, it is possible to distinguish from the crystalline polypropylene resin (D).

These crystalline polypropylene resins (D) may be used alone, or two or more thereof may be used in combination.

It is possible to use commercially available products as the crystalline polypropylene resin (D). Examples of the commercially available products include, for example, NOVATEC manufactured by Japan Polypropylene Corporation, Grand Polypro manufactured by Grand Polymer Co., Ltd., Prime Polypro manufactured by Prime Polymer Co., Ltd., and the like.

In the hot melt adhesive of the present invention, the amount of the component D is preferably 3 to 30 parts by weight, more preferably 5 to 25 parts by weight, and still more preferably 7.5 to 20 parts by weight, based on 100 parts by weight of the total weight of components A to E. When the hot melt adhesive contains the crystalline polypropylene resin (D) in the amount within the above range, heat resistance of the hot melt adhesive is improved, and also it becomes easy to apply the hot melt adhesive to a substrate.

<(E) Tackifier Resin>

The hot melt adhesive of the present invention contains a tackifier resin (E) (component E), and thus, tackiness can be improved. There is no particular limitation on the "tackifier resin" as long as it is commonly used in the hot melt adhesive and the objective hot melt adhesive of the present invention is obtainable.

Examples of the tackifier resin include a natural rosin, a modified rosin, a hydrogenated rosin, a glycerol ester of a natural rosin, a glycerol ester of a modified rosin, a pentaerythritol ester of a natural rosin, a pentaerythritol ester of a modified rosin, a pentaerythritol ester of a hydrogenated rosin, a copolymer of a natural terpene, a terpolymer of a natural terpene, hydrogenated derivatives of a copolymer of a hydrogenated terpene, a polyterpene resin, hydrogenated derivatives of a phenol-based modified terpene resin, an aliphatic petroleum hydrocarbon resin, hydrogenated derivatives of an aliphatic petroleum hydrocarbon resin, an aromatic petroleum hydrocarbon resin, hydrogenated derivatives of an aromatic petroleum hydrocarbon resin, a cyclic aliphatic petroleum hydrocarbon resin, and hydrogenated derivatives of a cyclic aliphatic petroleum hydrocarbon resin. These tackifier resins can be used alone or in combination. It is also possible to use, as the tackifier resin, a liquid type tackifier resin as long as it has a colorless to pale yellow color tone and has substantially no odor, and also has good thermal stability. Taking these characteristics into consideration comprehensively, the tackifier resin is preferably hydrogenated derivatives of resins.

It is possible to use commercially available products as the tackifier resin. Examples of these commercially available products include MARUKACLEAR H (trade name) manufactured by Maruzen Petrochemical CO, LTD.; CLEARON K100 (trade name) manufactured by YASUHARA CHEMICAL CO., LTD.; Alkon M100 (trade name) manufactured by Arakawa Chemical Industries, Ltd.; I-MARV 5100 (trade name) manufactured by Idemitsu Petroleum Chemical Co., Ltd.; CLEARON K4090 (trade name), CLEARON K4100, and CLEARON M105 (trade name) manufactured by YASUHARA CHEMICAL CO., LTD.; ECR 5380 (trade name), ECR 179EX (trade name), ECR 5400 (trade name), and ECR 5600 (trade name) manufactured by Exxon Mobil Corporation; Rigarite R7100 (trade name) and Eastotac H-100W manufactured by Eastman Chemical Company; ECR179EX (trade name) manufactured by Exxon Corporation; Alkon P100 (trade name) manufactured by Arakawa Chemical Industries, Ltd.; I-MARV 5110 (trade name), I-MARV Y135 (trade name), I-MARV P100 (trade name), and I-MARV P125 (trade name) manufactured by Idemitsu Kosan Co., Ltd.; Easttack C100-R (trade name) manufactured by Easttack Corporation; and KR-85 (trade name) manufactured by Arakawa Chemical Industries, Ltd. These commercially available tackifier resins can be used alone or in combination.

In the hot melt adhesive of the present invention, the component E is preferably comprised in the amount of 20 to 60 parts by weight, and more preferably 30 to 50 parts by weight, based on 100 parts by weight of the total weight of components A to E.

The hot melt adhesive of the present invention may comprise the above-mentioned components A to E, and preferable embodiment includes those in which component A comprises an amino group-modified conjugated diene-based copolymer, component B comprises polylactic acid, component C comprises an amorphous ethylene-based copolymer, and component D comprises crystalline polypropylene resin.

Particularly preferable embodiment of the present invention includes a hot melt adhesive in which component A comprises an amino group-modified styrene-ethylene/butylene-styrene block copolymer ("SEBS"), component B comprises polylactic acid, component C comprises a copolymer of ethylene with α-olefin having 3-20 carbon atoms, and component D comprises a crystalline random polypropylene resin.

Most preferable embodiment of the present invention includes a hot melt adhesive in which component A comprises an amino group-modified styrene-ethylene/butylene-styrene block copolymer ("SEBS"), component B comprises polylactic acid, component C comprises a copolymer of ethylene with propylene and 1-butene, and component D comprises a crystalline random polypropylene resin having a melting point of 120° C. or higher.

It is preferred that the hot melt adhesive of the present invention comprises, in addition to component A, component B, component C, component D, and component E, (F) a stabilizer (hereinafter also referred to as "component F"). A mixing proportion of a component F is preferably 0.1 to 2.0 parts by weight, and more preferably 0.2 to 0.5 part by weight, based on 100 parts by weight of the total amount of components A to E.

The "stabilizer" is used so as to prevent decrease in molecular weight, occurrence of gelation, coloration, odor, and the like of the hot melt adhesive due to heat, thereby improving stability of the hot melt adhesive, and there is no particular limitation as long as the objective hot melt adhesive of the present invention is obtainable. Examples of the "stabilizer" include, for example, an antioxidant and an ultraviolet absorber.

The "ultraviolet absorber" is used so as to improve light resistance of the hot melt adhesive. The "antioxidant" is used so as to prevent oxidative degradation of the hot melt adhesive.

Examples of the antioxidant include, for example, a phenol-based antioxidant, a sulfur-based antioxidant, and a phosphorus-based antioxidant. Examples of the ultraviolet absorber include, for example, a benzotriazole-based ultraviolet absorber and a benzophenone-based ultraviolet absorber. A lactone-based stabilizer can also be added. These antioxidants and ultraviolet absorbers can be used alone or in combination. The following products can be used as commercially available products of the antioxidant.

Specific examples thereof include SUMILIZERGM (trade name), SUMILIZER TPD (trade name) and SUMILIZER TPS (trade name) manufactured by Sumitomo Chemical Co. Ltd.; IRGANOX 1010 (trade name), IRGANOX HP2225FF (trade name), IRGAFOS 168 (trade name) and IRGANOX 1520 (trade name) manufactured by Ciba Specialty Chemicals Inc.; TINUVIN P; JF77 (trade name) manufactured by Johoku Chemical Co., Ltd; TOMINOX TT (trade name) manufactured by API Corporation; and AO-412S (trade name) manufactured by ADEKA Corporation. These stabilizers can be used alone or in combination.

The hot melt adhesive of the present invention can further contain a fine particle filler. There is no particular limitation on the fine particle filler as long as the fine particle filler is commonly used and the objective hot melt adhesive of the present invention is obtainable. Examples of the "fine particle filler" include mica, calcium carbonate, kaolin, talc, titanium oxide, diatomaceous earth, urea-based resin, styrene beads, baked clay, starch, and the like. The shape of these fine particle fillers is preferably spherical, and there is no particular limitation on the size (diameter in the case of a spherical shape).

The hot melt adhesive according to the present invention can be produced by compounding component A, component B, component C, component D and component E, optionally component F and, if necessary, various additives by the use of a commonly known method for producing a hot melt adhesive. For example, the hot melt adhesive can be produced by compounding the above-mentioned components in each prescribed amount, followed by melting with heating. There is no particular limitation on the order of the addition of the respective components, heating method, and the like as long as the objective hot melt adhesive is obtainable.

In preferred aspect of the present invention, the hot melt adhesive preferably has a viscosity (or melt viscosity) at 200° C. of 100,000 mPa·s or less, and particularly preferably less than 30,000 mPa·s. The viscosity, which enables uniform coating of the hot melt adhesive, is 30,000 mPa·s or less, and the viscosity, which enables uniform coating of the hot melt adhesive with ease, is less than 20,000 mPa·s. When the hot melt adhesive has a viscosity at 200° C. within the above range, the hot melt adhesive becomes more suitable for coating. As used herein, the viscosity (or melt viscosity) at 200° C. means the value measured by a Brookfield viscometer using a rotor No. 27.

The hot melt adhesive according to the present invention is widely used in paper processing, bookbinding, disposable products, automotive interior materials, and the like, and is particularly effectively used in automotive interior materials because of its excellent adhesion to a polyolefin substrate and a polyester substrate.

The automotive interior material according to the present invention is commonly produced by laminating a substrate and an adherent to each other using the above-mentioned hot melt adhesive there between. In the case of laminating the adherent to a plastic material as the substrate, the hot melt adhesive may be applied to either the substrate side or the adherent side. In the present invention, the "substrate" of the automotive interior material is preferably a polyolefin or polyester. There is no particular limitation on the "adherent", and a fibrous material is preferable. The fibrous material means a material in which a synthetic fiber or a natural fiber is formed into a sheet by knitting the fiber with the use of a spinning machine.

Specific examples of the automotive interior material include a ceiling material, a rear package tray, a door trim, a roof trim, a floor insulator, a trunk trim, a dash insulator, a retainer, a bracket, a clip seat, and the like.

There is no need to use a special apparatus in order to produce the automotive interior material of the present invention. It is possible to produce the automotive interior material by the use of commonly known production apparatuses including a conveyer, a coater, a press machine, a heater, and a cutter.

There is no particular limitation on the method for coating with the hot melt adhesive as long as the objective products are obtainable. Such coating method is roughly classified into a contact coating method and a non-contact coating method. The "contact coating" method means a coating method in which a discharger is brought into contact with a member or a film in the case of coating with the hot melt adhesive, while the "non-contact coating" method means a coating method in which a discharger is not brought into contact with a member or a film in the case of coating with the hot melt adhesive. Examples of the contact coating method include, for example, a slot coater coating method, a roll coater coating method, and the like, and examples of the non-contact coating method include a spiral coating capable of coating in a spiral form, an omega coating or control seam coating method capable of coating in a wavy form, a slot spray coating or curtain spray coating method capable of coating in a plane form, and a dot coating method capable of coating in a dot form.

Examples

The present invention will be described byway of Examples for the purpose of describing the present invention in a more detailed and more specific manner. These Examples are for illustrative purpose only and it is not to be construed restrictively.

Components compounded in a hot melt adhesive in Examples and Comparative Examples are shown below.

<(A) Polar Functional Group-Modified Conjugated Diene-Based Polymer>

(A1) Amino group-modified SEBS ("DYNARON 8630P", manufactured by JSR Corporation)

(A2) Maleic acid group-modified SEBS ("TAFTEC M1943", manufactured by Asahi Kasei Chemicals Corporation)

<(B) Aliphatic Polyester-Based Resin>

(B1) Poly-LD-lactic acid resin ("4060D", manufactured by NatureWorks, LLC)

(B2) Poly-L-lactic acid resin ("4032D", manufactured by NatureWorks, LLC)

(B3) Polybutylene succinate resin ("AD92W", manufactured by Mitsubishi Chemical Corporation)

<(C) Amorphous Olefin-Based Polymer>

(C1) Propylene/ethylene/l-butene copolymer ("VESTPLAST 703", manufactured by EVONIK DEGUSSA)

(C2) Propylene/ethylene/1-butene copolymer ("VESTPLAST 750", manufactured by EVONIK DEGUSSA)

(C3) Ethylene/octene copolymer ("AFFINITY GA1950", manufactured by The Dow Chemical Company)

<(D) Crystalline Polypropylene Resin>

(D1) Random polypropylene polymer ("Prime Polypro E239", manufactured by Prime Polymer Co., Ltd.)

<(E) Tackifier Resin>

(E1) Hydrogenated terpene-based resin ("CLEARON P135", manufactured by YASUHARA CHEMICAL CO., LTD.)

(E2) Hydrogenated derivatives of aromatic petroleum hydrocarbon resin (I-MARV P125, manufactured by Idemitsu Kosan Co., Ltd.)

(E3) Hydrogenated derivatives of aromatic petroleum hydrocarbon resin (I-MARV P100, manufactured by Idemitsu Kosan Co., Ltd.)

(E4) Hydrogenated terpene-based resin ("CLEARON M115", manufactured by YASUHARA CHEMICAL CO., LTD.)

<(F) Stabilizer>

(F1) Antioxidant ("AO-60", manufactured by ADEKA Corporation)

Components (A) to (F) were compounded according to the formulation shown in Table 1, followed by melt mixing at about 160° C. over about 3 hours using a universal stirrer to produce hot melt adhesives of Examples 1 to 8 and Comparative Examples 1 to 4. All numerical values with respect to the formulation (composition) of the hot melt adhesives shown in Table 1 are represented by parts by weight.

With respect to the respective hot melt adhesives of Examples and Comparative Examples, thermal stability, peel strength to various substrates, and shear strength were evaluated. Outline of the respective evaluations will be described below.

<180° Peel Strength Polypropylene (PP) Plate/Polyester Nonwoven Fabric (Temperature at the Time of Measurement: 23° C. or 80° C.)>

Adhesive property of the hot melt adhesives were evaluated from the peel strength of a PP plate/polyester nonwoven fabric ("Bonnip", manufactured by Maeda Kosen Co., Ltd.) to an adherent. The hot melt adhesive was melted in air at 180° C. and then applied to a PP substrate under the conditions of an open time of 20 seconds and a coating weight of 0.30 g/inch, followed by lamination of a polyester nonwoven fabric (basis weight of 300 g/m$^2$) to produce specimens.

Each specimen was left to stand in a room at 23° C. for 1 day and then the 180° peel strength was measured at a stroke speed of 300 ram/min by the use of UR-500L Road Cell (maximum load of 500 kg) manufactured by ORIENTEC Co., Ltd. and a testing machine RTM-250 manufactured by ORIENTEC Co., Ltd. The peel strength was measured at the temperature of 23° C. and 80° C., respectively. Evaluation criteria are as follows.

(Peel strength measured at 23° C.)

A: More than 16 kg/inch

B: More than 10 kg/inch and 16 kg/inch or less

C: More than 8 kg/inch and 10 kg/inch or less

D: 8 kg/inch or less, or unmeasurable since hot melt is not formed (Peel strength measured at 80° C.)

A: More than 5 kg/inch

B: More than 2 kg/inch and 5 kg/inch or less

C: More than 1 kg/inch and 2 kg/inch or less

D: 1 kg/inch or less, or unmeasurable since hot melt is not formed

<Shear Adhesive Strength (PP/PP 80° C.)>

Adhesive property of the hot melt adhesives were evaluated from the tensile shear strength of polypropylene (PP) to an adherent. A strip-shaped sample measuring 25 mm in width, 100 mm in length, and 2 mm in thickness was used as each adherent. The hot melt adhesive was melted in air at 180° C. and then two adherents were laminated to each other so as to obtain specimens each having a coating area of 25 mm square and a thickness of 2 mm.

Each specimen was left to stand in a room at 23° C. for 1 day and then the tensile shear strength was measured at a stroke speed of 3-00 mm/min bu the use of UR-500L Road Cell (maximum load of 500 kg) manufactured by ORIENTEC Co., Ltd. and a testing machine RTM-250 manufactured by ORIENTEC Co., Ltd. The temperature at the time of the measurement of the shear strength was 80° C. Evaluation criteria are as follows.

A: More than 0.5 MPa

B: 0.3 MPa or more and 0.5 MPa or less

C: 0.1 MPa or more and less than 0.3 MPa

D: Less than 0.1 MPa, or unmeasurable since hot melt is not formed

<Thermal Stability>

In a 70 ml glass bottle, 35 g of a hot melt adhesive was charged and, after being left to stand in a dryer at 180° C. for 24 hours, change in appearance was visually evaluated.

A: None of phase separation, carbide, and ring (degraded hot melt adhesive precipitated in a ring form) was observed.

B: Phase separation, carbide, and ring were very slightly observed.

C: Phase separation, carbide, and ring were slightly observed.

D: Phase separation, carbide, and ring were observed.

TABLE 1

| | Example 1 | Example 2 | Example 3 | Example 4 | Example 5 | Example 6 | Example 7 | Example 8 | Comp. Example 1 | Comp. Example 2 | Comp. Example 3 | Comp. Example 4 |
|---|---|---|---|---|---|---|---|---|---|---|---|---|
| (A1) | 2 | 5 | 8 | 5 | 5 | 8 | | | | 2 | 8 | 5 |
| (A2) | | | | | | | 10 | 10 | | | | |
| (B1) | | 10 | 25 | 30 | 30 | 25 | | | 30 | | 60 | 30 |
| (B2) | 35 | | | | | | | | | | | |
| (B3) | | | | | | | 10 | 10 | | | | |
| (C1) | 30 | 25 | 27 | | | | | | 20 | 25 | | 30 |
| (C2) | | | | 17.5 | 20 | 20 | 30 | 25 | | | 15 | |
| (C3) | | | | | | | | 5 | | | | |
| (D1) | 5 | 20 | 10 | 7.5 | 15 | 15 | 15 | 20 | 20 | 25 | 17 | |
| (E1) | | | | | 30 | | | | | | | |
| (E2) | 28 | 40 | 30 | | | 32 | 35 | 30 | 30 | 48 | | 15 |
| (E3) | | | | 20 | | | | | | | | 20 |
| (E4) | | | | 20 | | | | | | | | |
| (F1) | 0.5 | 0.5 | 0.5 | 0.5 | 0.5 | 0.5 | 0.5 | 0.5 | 0.5 | 0.5 | 0.5 | 0.5 |
| Total (Parts by weight) | 100.5 | 100.5 | 100.5 | 100.5 | 100.5 | 100.5 | 100.5 | 100.5 | 100.5 | 100.5 | 100.5 | 100.5 |

TABLE 1-continued

| | Example 1 | Example 2 | Example 3 | Example 4 | Example 5 | Example 6 | Example 7 | Example 8 | Comp. Example 1 | Comp. Example 2 | Comp. Example 3 | Comp. Example 4 |
|---|---|---|---|---|---|---|---|---|---|---|---|---|
| 180° Peel strength PP/Polyester nonwoven fabric measured at 23° C. (kg/inch) | >16 | >16 | >16 | >16 | >16 | >16 | >16 | >16 | Unmeasurable | 4.0 | 6.5 | >16 |
| Evaluation | A | A | A | A | A | A | A | A | D | D | D | A |
| 180° Peel strength PP/Polyester nonwoven fabric measured at 80° C. (kg/inch) | 3.0 | 9.0 | 5.3 | 5.5 | 9.5 | 12.0 | 10.0 | 3.0 | Unmeasurable | 15.0 | 1.2 | 0.9 |
| Evaluation | B | A | A | A | A | A | A | B | D | A | C | D |
| Shear adhesive strength PP/PP measured at 80° C. (MPa) | 0.3 | 0.8 | 0.6 | 0.6 | >1.0 | 0.8 | 0.8 | 0.4 | Unmeasurable | >1.0 | 0.6 | 0.05 |
| Evaluation | B | A | A | A | A | A | A | B | D | A | A | D |
| Thermal stability at 180° C. for 1 day | A | A | A | A | A | A | A | A | D | A | A | A |

As shown in Table 1, the hot melt adhesives of Examples 1 to 8 are less likely to undergo embrittlement and are excellent in peel strength, and are also excellent in adhesion to a polyolefin substrate and a polyester substrate since they comprise all of five components such as component A, component B, component C, component D, and component E. Furthermore, the hot melt adhesives of Examples 1 to 8 are also excellent in thermal stability because of satisfactory compatibility (thermal stability evaluation) of the respective components. The hot melt adhesives are environmentally preferable because of comprising component B, and are also excellent in heat resistance (shear strength evaluated at 80° C.) because of comprising component D.

INDUSTRIAL APPLICABILITY

The present invention can provide a hot melt adhesive, and an automotive interior material coated with the hot melt adhesive. The automotive interior material according to the present invention is particularly effectively an automotive interior material produced from a polyolefin substrate and a polyester substrate.

What is claimed is:

1. A hot melt adhesive comprising:

(A) a polar functional group-modified conjugated diene-based polymer wherein the polar functional group is an acid anhydride group and the conjugated diene-based polymer comprises a block copolymer of a vinyl-based aromatic hydrocarbon block and a conjugated diene compound block, (B) at least one aliphatic polyester-based resin selected from a polylactic acid-based resin, polybutylene succinate, polyhydroxybutyric acid, and combinations thereof, (C) an amorphous ethylene-based copolymer, (D) a crystalline polypropylene resin with a melting point of about 120° C. or higher, and (E) a tackifier resin;

wherein (A) is present in an amount of about 1 to about 20 parts by weight, (B) is present in an amount of about 5 to about 50 parts by weight, (C) is present in an amount of about 5 to about 60 parts by weight, (D) is present in an amount of about 3 to about 30 parts by weight, and (E) is present in an amount of about 20 to about 60 parts by weight, all based on 100 parts by weight of the total weight of the components (A) to (E).

2. The hot melt adhesive according to claim 1, wherein the polar functional group-modified conjugated diene-based polymer (A) comprises at least one selected from an amino group-modified hydrogenated-type styrene block copolymer and a maleic acid group-modified hydrogenated-type styrene block copolymer.

3. The hot melt adhesive according to claim 1, wherein (B) comprises the polylactic acid-based resin.

4. The hot melt adhesive according to claim 1, wherein the amorphous ethylene-based copolymer (C) comprises an ethylene/propylene/1-butene copolymer.

5. The hot melt adhesive according to claim 1, wherein the amount of the crystalline polypropylene resin (D) is about 5 to about 25 parts by weight based on 100 parts by weight of the total weight of the components (A) to (E).

6. An automotive interior material comprising the hot melt adhesive according to claim 1.

7. An automotive interior material comprising the hot melt adhesive according to claim 1 disposed on a polyolefin substrate or a polyester substrate.

8. An automotive interior material comprising a polyolefin substrate or a polyester substrate bonded to an adherent by the hot melt adhesive according to claim 1.

9. An automotive interior material comprising a polyolefin substrate or a polyester substrate bonded to a fibrous adherent by the hot melt adhesive according to claim 1.

10. A hot melt adhesive comprising:

(A) an amino group-modified styrene-ethylene/butylene-styrene block copolymer, a maleic acid group-modified styrene-ethylene/butylene-styrene block copolymer, or a combination thereof, (B) a polylactic acid-based resin, (C) an amorphous ethylene/propylene/1-butene copolymer, an amorphous ethylene/octene copolymer, or combinations thereof, (D) a crystalline polypropylene resin with a melting point of about 120° C. or higher, and (E) a tackifier resin;

wherein (A) is present in an amount of about 1 to about 20 parts by weight, (B) is present in an amount of about 5 to about 50 parts by weight, (C) is present in an amount of about 5 to about 60 parts by weight, (D) is present in an amount of about 3 to about 30 parts by weight, and (E) is present in an amount of about 20 to about 60 parts by weight, all based on 100 parts by weight of the total weight of the components (A) to (E).

11. An automotive interior material comprising the hot melt adhesive according to claim 10.

12. An automotive interior material comprising the hot melt adhesive according to claim 10 disposed on a polyolefin substrate or a polyester substrate.

13. An automotive interior material comprising a polyolefin substrate or a polyester substrate bonded to an adherent by the hot melt adhesive according to claim 10.

14. An automotive interior material comprising a polyolefin substrate or a polyester substrate bonded to a fibrous adherent by the hot melt adhesive according to claim 10.

15. A hot melt adhesive comprising:

(A) a polar functional group-modified conjugated diene-based polymer selected from the group consisting of an amino group-modified styrene-ethylene/butylene-styrene block copolymer, a maleic acid group-modified styrene-ethylene/butylene-styrene block copolymer, and a combination thereof, (B) an aliphatic polyester-based resin selected from the group consisting of a poly-LD-lactic acid resin, a poly-L-lactic acid resin, a polybutylene succinate resin, and combinations thereof, (C) an amorphous olefin-based polymer selected from the group consisting of a propylene/ethylene/1-butene copolymer, an ethylene/octene copolymer, and combinations thereof, (D) a crystalline polypropylene resin comprises a random polypropylene polymer with a melting point of about 120° C. or higher, and (E) a tackifier resin selected from the group consisting of a hydrogenated terpene-based resin, a hydrogenated derivatives of aromatic petroleum hydrocarbon resin, and combinations thereof;

wherein (A) is present in an amount of about 2 to about 10 parts by weight, (B) is present in an amount of about 10 to about 35 parts by weight, (C) is present in an amount of about 5 to about 30 parts by weight, (D) is present in an amount of about 5 to about 20 parts by weight, and (E) is present in an amount of about 20 to about 40 parts by weight, all based on 100 parts by weight of the total weight of the components (A) to (E).

16. An automotive interior material comprising the hot melt adhesive according to claim 15.

17. An automotive interior material comprising the hot melt adhesive according to claim 15 disposed on a polyolefin substrate or a polyester substrate.

18. An automotive interior material comprising a polyolefin substrate or a polyester substrate bonded to an adherent by the hot melt adhesive according to claim 15.

19. An automotive interior material comprising a polyolefin substrate or a polyester substrate bonded to a fibrous adherent by the hot melt adhesive according to claim 15.

* * * * *